United States Patent [19]

Leistner et al.

[11] 4,104,217

[45] Aug. 1, 1978

[54] CARBONATE ESTER STABILIZERS FOR POLYMERS

[75] Inventors: William E. Leistner, Atlantic Beach, N.Y.; Motonobu Minagawa, Kosigaya, Japan; Yutaka Nakahara, Iwatsuki, Japan; Tohru Haruna, Okegawa, Japan

[73] Assignee: Argus Chemical Corporation, Brooklyn, N.Y.

[21] Appl. No.: 761,886

[22] Filed: Jan. 24, 1977

[51] Int. Cl.$^2$ .......................... C07C 69/00; C08K 5/10
[52] U.S. Cl. ................... 260/23 XA; 252/404; 260/23 H; 260/45.7 R; 260/45.95 R; 260/45.95 H; 260/463; 260/860; 528/196
[58] Field of Search ........... 260/463, 47 XA, 45.95 B, 260/45.95 R, 45.95 H, 45.7 R, 860, 23 XA, 23 H; 252/404

[56] References Cited

U.S. PATENT DOCUMENTS

| | | | |
|---|---|---|---|
| Re. 27,682 | 6/1973 | Schnell et al. | 260/47 XA |
| 2,946,766 | 7/1960 | Schnell et al. | 260/47 XA |
| 2,999,841 | 9/1961 | Csendes | 260/45.95 E |
| 3,026,264 | 3/1962 | Rocklin et al. | 260/45.95 B |
| 3,036,036 | 5/1962 | Howe | 260/47 XA |
| 3,136,741 | 6/1964 | Schnell et al. | 260/47 XA |
| 3,239,484 | 3/1966 | Stark | 260/45.95 B |
| 3,244,650 | 4/1966 | Hecker et al. | 260/45.95 E |
| 3,312,660 | 4/1967 | Kurkjy et al. | 260/463 |
| 3,357,946 | 12/1967 | Burgess | 260/45.95 B |
| 3,420,894 | 1/1969 | Pierce et al. | 260/47 XA |
| 3,453,225 | 7/1969 | Pollock | 260/23 XA |
| 3,510,507 | 5/1970 | Bown et al. | 260/463 |
| 3,544,514 | 12/1970 | Schnell et al. | 260/47 XA |
| 3,748,303 | 7/1973 | Becker et al. | 260/47 XA |
| 3,890,266 | 6/1975 | Serini et al. | 260/860 |
| 4,009,148 | 2/1977 | Neuray et al. | 260/463 |
| 4,032,510 | 6/1977 | Floyd | 260/45.85 S |

*Primary Examiner*—V. P. Hoke
*Attorney, Agent, or Firm*—Otto S. Kauder

[57] ABSTRACT

This invention relates to a new class of polyhydric phenol carbonate esters and to synthetic resin stabilizer compositions comprising these esters as well as to synthetic resins stabilized with such esters and with stabilizer compositions comprising these esters along with known polymer stabilizers.

17 Claims, No Drawings

CARBONATE ESTER STABILIZERS FOR POLYMERS

BACKGROUND OF THE INVENTION

The usefulness of phenols in stabilizer compositions for synthetic resins was recognized early in the development of polymer stabilization by additives, as disclosed for example by F. Duggan in U.S. Pat. No. 2,126,179 of Aug. 9, 1938, W. Leistner in U.S. Pat. No. 2,564,646 of Aug. 14, 1951, and W. Fischer in U.S. Pat. No. 2,625,521 of Jan. 13, 1953, in the stabilization of polyvinyl chloride resin compositions. Over the years, phenolic stabilizers have been used in an expanding variety of synthetic resins and an enormous number of disclosures of new phenolic stabilizers has accumulated. Rather than attempt to list every one of these disclosures, A. DiBattista in U.S. Pat. No. 3,824,192 of July 16, 1974 and M. Minagawa in U.S. Pat. No. 3,849,370 of Nov. 19, 1974 and in U.S. Pat. No. 3,869,423 of Mar. 4, 1975 are cited as summaries of a very large part of the existing art of phenolic stabilizers.

Phenolic stabilizers are also employed in conjunction with other stabilizers such as esters of thiodipropionic acid or organic phosphites in the stabilization of polypropylene and other synthetic resins against degradation upon heating or ageing under atmospheric conditions. Disclosures by C. Tholstrup, U.S. Pat. Nos. 3,033,814 of May 8, 1962 and 3,160,680 of Dec. 8, 1964; L. Rayner, U.S. Pat. No. 3,181,971 of May 4, 1965; D. Bown, U.S. Pat. No. 3,242,135 of Mar. 22, 1966; S. Murdock, U.S. Pat. No. 3,245,949 of Apr. 12, 1966; H. Hagemeyer, U.S. Pat. No. 3,282,890 of Nov. 1, 1966; J. Casey, U.S. Pat. Nos. 3,496,128 of Feb. 17, 1970 and 3,586,657 of June 22, 1971; M. Minagawa, U.S. Pat. Nos. 3,549,572 of Dec. 22, 1970, and 3,629,189 of Dec. 21, 1971, and 3,673,152 of June 27, 1972, 3,849,370 of Nov. 19, 1974 and 3,869,423 of Mar. 4, 1975; W. Drake U.S. Pat. No. 3,624,026 of Nov. 30, 1971; A. DiBattista, U.S. Pat. No. 3,824,192 of July 16, 1974; B. Cook, U.S. Pat. No. 3,850,877 and H. Mueller U.S. Pat. No. 3,850,918 of Nov. 26, 1974; M. Dexter U.S. Pat. Nos. 3,856,748 of Dec. 24, 1974, and 3,888,824 of June 10, 1975, and 3,903,160 of Sept. 2, 1975; P. Klemchuk of U.S. Pat. No. 3,860,558 of Jan. 14, 1975; M. Rasberger U.S. Pat. Nos. 3,867,340 of Feb. 18, 1975 and 3,901,931 of Aug. 26, 1975; H. Brunetti U.S. Pat. Nos. 3,867,337 of Feb. 18, 1975 and 3,873,498 of Mar. 25, 1975; S. Rosenberger U.S. Pat. Nos. 3,884,874 of May 20, 1975 and 3,887,518 of June 3, 1975; C. Ramey U.S. Pat. No. 3,907,803 of Sept. 23, 1975 are representative of a very large number of stablilzer combinations including dilauryl and distearyl thiodipropionate or other dialkyl thiodipropionates along with polyhydricphenols and sometimes organic phosphites, metallic stearates, ultraviolet absorbers, nickel compounds, and heavy metal deactivators for use in polypropylene and other polyolefins.

Disclosures by R. Werkheiser, U.S. Pat. No. 2,726,226 of Dec. 6, 1975; I. Salyer et al, U.S. Pat. No. 2,985,617 of May 23, 1961; L. Friedman, U.S. Pat. No. 3,039,993 of June 19, 1962; W. Nudenberg, U.S. Pat. No. 3,080,338 of Mar. 5, 1963; C. Fuchsman, U.S. Pat. No. 3,082,187 of Mar. 19, 1963; H. Orloff et al, U.S. Pat. No. 3,115,465 of Dec. 24, 1963; A. Nicholson, U.S. Pat. No. 3,167,526 of Jan. 26, 1965; A. Hecker et al, U.S. Pat. Nos. 3,149,093 of Sept. 15, 1964, 3,244,650 of Apr. 5, 1966 and 3,225,136 and 3,255,151 of June 7, 1966; C. Bawn, U.S. Pat. No. 3,352,820 of Nov. 14, 1967; D. Miller, U.S. Pat. No. 3,535,277 of Oct. 20, 1970; J. Casey, U.S. Pat. No. 3,586,657 of June 22, 1971; C. Abramoff U.S. Pat. No. 3,856,728 of Dec. 24, 1974; M. Minagawa, U.S. Pat. Nos. 3,869,423 of Mar. 4, 1975 and 3,907,517 of Sept. 23, 1975; and British Pat. Nos. 846,684, 851,670, and 866,883 are representative of stabilizer combinations including organic phosphites, polyhydric phenols, and other active ingredients.

As summarized in a publication by D. Plank and J. Floyd (title: "Polycarbonates: A New Concept in Stabilization for Polypropylene", meeting preprints, Society of Plastics Engineers, Houston, Texas, Apr. 1975; pages 33-37), there have long been several problems with using phenols as stabilizers despite their widespread use. Many phenol stabilizers are volatilized out of the polymer at high use temperatures. Some phenol stabilizers are extractable under certain use conditions. The oxidative products of most phenols are highly colored, thus imparting a yellow color to the polymer. Many phenols are reactive towards acidic or basic residues in the polymer. Following are disclosures of suggested ways to overcome these problems.

L. Friedman has disclosed in U.S. Pat. No. 3,053,878 of Sept. 11, 1962 a class of linear phosphite polymers having the formula

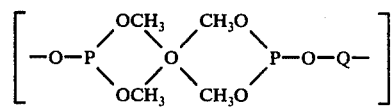

in which Q is the alkylene or arylene portion of a dihydric alcohol or dihydric phenol. R. Morris et al. in U.S. Pat. No. 3,112,286 of Nov. 26, 1963 disclosed phosphites having the formula

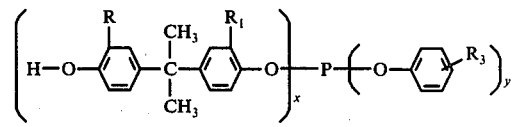

in which R represents a bulky hydrocarbon group such as t-butyl, t-amyl, t-hexyl, cyclohexyl, t-pentyl, t-octyl, phenyl, and the like: $R_1$ represents hydrogen and R; $R_3$ represents an alkyl group from 6 to 20 carbon atoms which is preferably in the meta or para position; $x$ represents a number of from 1 to 3 inclusive; $y$ represents a number of from 0 to 2 inclusive and the sum of the numerical value of $x+y$ is always exactly 3.

D. Brown, U.S. Pat. No. 3,297,631 of Jan. 10, 1967 disclosed condensation products of phosphorus compounds with bisphenols and trisphenols which may be represented by the structures:

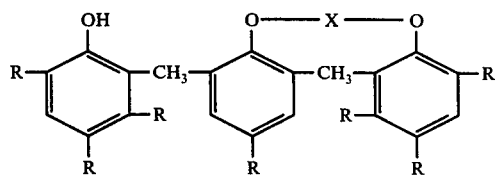

-continued

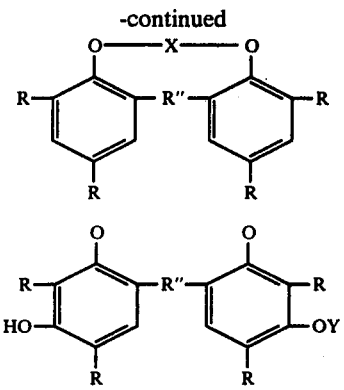

Where:

X is selected from the following:

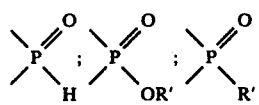

and Y is selected from the following: $-P(OR')_2$;

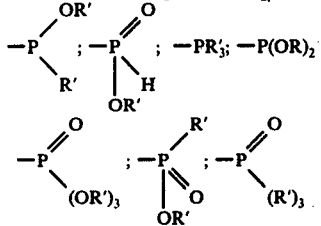

R is hydrogen, alkyl of 1 to 16 carbon atoms or aryl or a combination of these; R' is alkyl of 1 to 16 carbon atoms or aryl, anf R" is alkylidene of 1 to 16 carbon atoms or an aryl-substituted alkylidene. C. Baranauckas, U.S. Pat. No. 3,305,608 of Feb. 21, 1967, disclosed phenolic phosphites useful as polymer stabilizers prepared by reacting a triorganophosphite, a polyol, and an aromatic material having two to six phenolic hydroxyl groups at 60°–180° C in specified proportions.

G. Brindell, U.S. Pat. No. 3,412,064 of Nov. 19, 1968 disclosed phenolic phosphites represented by the general formula:

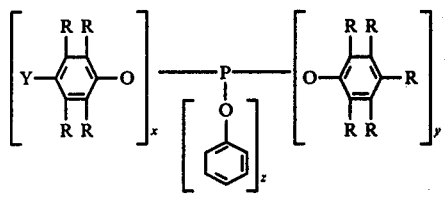

where x is from 1 to 3, y and z each from 0 to 2, $x+y+z=3$, R is hydrogen or alkyl and Y is hydroxyl or a group of the formula

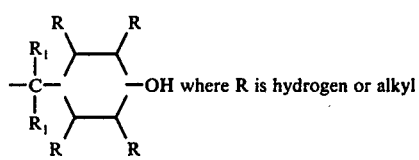

M. Larrison, U.S. Pat. No. 3,419,524 of Dec. 31, 1968, disclosed phosphites useful as polymer stabilizers having the formula:

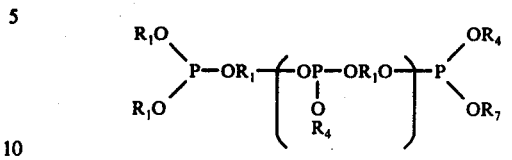

where $R_1$, $R_2$, $R_4$, $R_6$, and $R_7$ are aryl or haloaryl, and $R_3$ and $R_5$ are a polyalkylidene glycol or an alkylidene bisphenol or a hydrogenated alkylidene bisphenol or a ring halogenated alkylidene bisphenol from which the two terminal hydrogens have been removed. O. Kauder et al, U.S. Pat. Nos. 3,476,699 of Nov. 4, 1969 and 3,655,832 of April 11, 1972 disclosed organic phosphites containing a free phenolic hydroxyl group and defined by the formula:

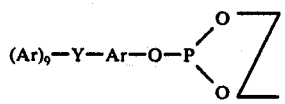

wherein

Z is selected from the group consisting of hydrogen and aliphatic, cycloaliphatic, aromatic, heterocyclic and $(Ar)_pY$-Ar groups, taken in sufficient number to satisfy the valences of the two phosphite oxygen atoms; Y is a polyvalent linking group selected from the group consisting of oxygen; aliphatic, cycloaliphatic and aromatic hydrocarbon groups attached to each Ar group through a carbon atom not a member of an aromatic ring; oxyaliphatic; thioaliphatic, oxycycloaliphatic, thiocycloaliphatic; heterocyclic; oxyheterocyclic, thioheterocyclic, carbonyl, sulfinyl; and sulfonyl groups; Ar is a phenolic nucleus which can be phenyl or a polycarbocyclic group having condensed or separate phenyl rings; each Ar group is either connected through an oxygen atom to a phosphite group or contains a free phenolic hydroxyl group, or both; and p is a number, one or greater, and preferably from one to four, which defines the number of Ar groups linked to Y.

L. Friedman, U.S. Pat. No. 3,516,963 of June 23, 1970, disclosed phosphites having the formula:

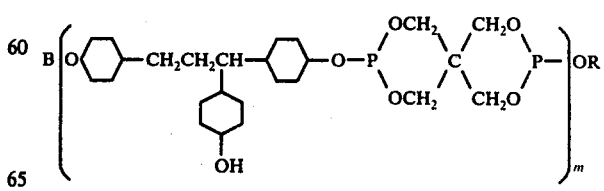

where R is alkyl, alkenyl, aryl, aralkyl, haloaryl, haloalkyl or

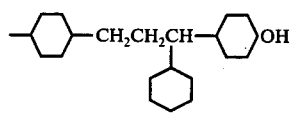

and n is an integer of at least 1. n can be 2, 3, 4, 5, 6, 7, 8, 10, 50, 100 or even more.

D. Bown et al. in U.S. Pat. Nos. 3,510,507 of May 5, 1970 and 3,691,132 of Sept. 12, 1972 disclosed polyolefins stabilized with polyphosphites, polyphosphates, polyphosphonites, polyphosphonates, polyborates, polycarbonates, and polysilanes which are condensation products of a 4,4'-bisphenol with a condensing or linking agent which may be of the ester type, such as the esters of triaryl or mixed aryl-alkyl compounds, or the acid halide type. Brown's condensation product stabilizers have molecular weights between 600 and 8000 or higher and are described by the structural formula,

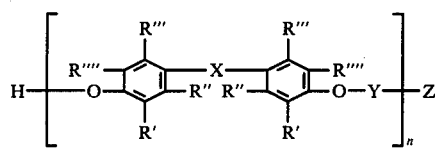

where X is selected from the group consisting of

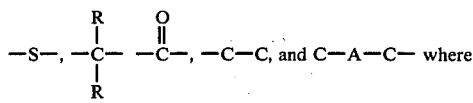

A is a $C_1$ to $C_{16}$ alkylene or an arylene; R', R'', R''', and R'''' are selected from the group consisting of hydrogen, $C_1$ to $C_{18}$ alkyls, and an aryl group, Y is selected from the group of

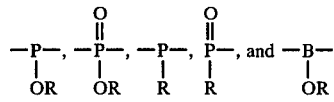

where R is hydrogen, a $C_1$ to $C_{18}$ alkyl, or aryl;

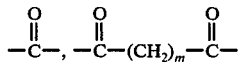

where m is 0 to 10, preferably 4 to 8,

where A' is $(CH_2)_n$—S—$(CH_2)_n$ or —$(CH_2)_n$—S—$(CH_2)_m$—S—$(CH_2)_n$ where n is 0 to 10, preferably 2 and m is 0 to 10, preferably 5;

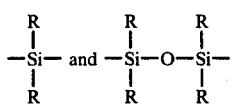

where R is an alkyl, preferably methyl, and Z is

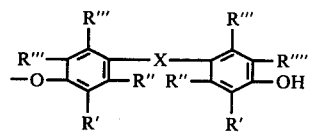

where R', R'', R''', R'''', and X correspond respectively to the R', R'', R''', R'''', and X previously selected when n has a value from 1 to 15, or Z may be derived from the compound used to introduce Y into the product when n has a value from 2 to 15, for example —R or —OR where R is hydrogen, an alkyl, or aryl. When Y in the formula of Bown's stabilizer is

the stabilizer is a type of hydroxyaryl phosphite. Similarly, when Y in the formula is

the stabilizer is a hydroxyaryl carbonate.

Bown's condensation products are described as especially effective in high molecular weight solid polyolefins when used together with a dialkyl sulfide costabilizer such as dilauryl thiodipropionate, distearyl thiodipropionate, ditridecyl thiodipropionate, dicetyl sulfide, bis(tetradecylmercapto) paraxylylene and 10,24-dithiotetracontane. J. Floyd et al in German published application 2505071 of August 14, 1975 abstracted in Chemical Abstracts 1976, Volume 84, abstract no. 5945f, disclosed low molecular weight polycarbonate esters of bisphenols such as 2,2-bis(3-t-butyl-4-hydroxyphenylpropane) and 4,4'-butylidene bis(6-t-butyl-3-methylphenol) prepared in such a way as to contain few or no free phenolic hydroxyl groups as being highly effective heat and light stabilizers for polyolefins and giving a synergistic effect with distearyl thiodipropionate, tris (nonylphenyl) phosphite, and distearyl pentaerythritoldiphosphite.

D. Plank and J. Floyd in the 1975 publication already cited have disclosed two general synthetic procedures for preparing stabilizer polycarbonates. They may be obtained by direct phosgenation of a bisphenol either in methylene chloride with pyridine as a catalyst or directly in pyridine. Using this procedure, a typical product obtained has the following formula.

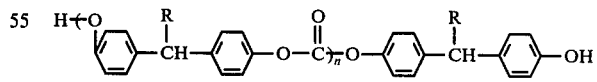

The authors did not state the nature of R or a value of n but did indicate that the molecular weight can be controlled easily by adding a modifier to the reaction mixture. The nature of the modifier is not mentioned. The authors disclosed a range of molecular weights from 680 to 1952, with the highest molecular weight products providing the longest 150° C oven life in polypropylene also containing a thioester, distearyl thiodipropionate. The authors stated that when used alone, two products within their class of polycarbonates are not effective stabilizers, but they formed a very effective stabilizing system in combination with a thioester.

In other disclosures of polyhydric phenol carbonate ester additives to synthetic resin compositions, H. Peters in German Pat. No. 1,146,251 of Mar. 28, 1963 improved mechanical properties of polyolefins by adding 0.5 to 50% 2,2 bis (4-hydroxyphenylpropane) carbonic acid polyester. T. Saito in U.S. Pat. No. 3,364,281 of Jan. 16, 1968 disclosed polyolefin fibers of improved dyeability containing 1 to 20% of polymeric additive which can be a high molecular weight polyhydric phenol carbonate. Solvay et Cie. in British Pat. No. 1,135,976 of Dec. 11, 1968 has disclosed the use of a high molecular weight bis (hydroxyphenyl) propane-phosgene condensation product as an adjunct to the polymerization initiator for the polymerization of ethylene. I. Ouchi in Japanese Pat. 69-21,676 of Sept. 16, 1969 improved the smoothness of polyethylene terephthalate film by incorporating a small percentage of polycarbonate. Z. Opritz in USSR Pat. No. 314,827 of Sept. 21, 1971 disclosed improved heat resistance of polyamides prepared from amino acids or lactams by addition of up to 10% of a polycarbonate having a formula $(OC_6H_4RC_6H_4O_2C)_x$ where R is $CH_2$, $CMe_2$, or $C(C_nH_{2n+1})_2$. Y. Umezawa in Japanese Kokai 72-34,744 of November 22, 1972 disclosed styrene-acrylonitrile copolymer compositions having improved moldability and mechanical properties with 5 to 40% polycarbonate resin. None of these disclosures relates to an ester of a polyhydric phenol having an odd number of benzenoid rings with carbonic acid or to a carbonate ester of molecular weight less than 10,000.

Carbonate esters of dihydric phenols having two benzenoid rings linked through a two-valent hydrocarbon linking group and carbonate coesters of two or more such dihydric phenols are known in the form of high molecular weight thermoplastic materials that are useful as films, fibers, molded or extruded parts and surface coatings for use in structural, decorative and electrical applications. The extensive literature has been reviewed by L. Bottenbruch in "Encyclopedia of Polymer Science and Technology" (N. Bikales, ed.) Volume 10, pages 714–725 (J. Wiley - Interscience publishers, New York 1969). H. Schnell in U.S. Pat. No. 3,028,365 of Apr. 3, 1962 mentions cross-linked carbonate ester polymers of resorcinol and hydroquinone as useless for the preparation of plastics.

SUMMARY OF THE INVENTION

In accordance with this invention, new carbonate esters of at least one hydrocarbon substituted polyhydric phenol having 2 to 3 phenolic hydroxyl groups disposed on an odd number of benzenoid rings with carbonic acid are prepared. The esters have molecular weights ranging from 700 to about 10,000, preferably from 1200 to about 7000 for highest effectiveness as ingredients of stabilizer compositions for synthetic resins. The esters of the invention can contain a single polyhydric phenol or a plurality of polyhydric phenols.

Synthetic resin stabilizer compositions comprising the esters of this invention contain at least one known polymer stabilizer along with one or more esters according to this invention. The proportions of ester to known polymer stabilizer in such stabilizer compositions can range from 1 to 1 to about 1 to 30 by weight.

DESCRIPTION OF THE PREFERRED EMBODIMENTS

Essential to the achievement of the unexpected effectiveness in resin stabilizer compositions of the carbonate esters of this invention are the hydrocarbon substituted aromatic structure with the odd number of benzenoid rings and controlled molecular weight of the polyhydric phenol carbonic acid esters. There results from these essential features a minimal volatility and leachability so that the stabilizing effectiveness manifested by the esters is maintained over long periods of time when resin compositions stabilized with the esters are exposed to the action of air, water, and chemical solutions at an elevated temperature.

The polyhydric phenol carbonate esters of this invention are derived from carbonic acid, introduced into the molecule by a carbonylating agent such as an ester or acid chloride of carbonic acid; and at least one hydrocarbon substituted polyhydric phenol having two to three hydroxyl groups disposed on an odd number of benzenoid rings each substituted with one to four alkyl, cycloalkyl, or aralkyl groups having 1 to 10 carbon atoms. At least one hydrocarbon substituent is located ortho to each phenolic group in the polyhydric phenol. The polyhydric phenol carbonate esters of this invention are crystalline powders or grindable glassy solids.

A preferred class of polyhydric phenol carbonate esters of this invention is derived from ortho-substituted 1,3- and 1,4-dihydric phenols having one benzenoid ring such as 2,5-di-t-butyl-hydroquinone, 2,3,6-trimethylhydroquinone, 2-methylresorcinol, and 2,6-di-t-butyl-resorcinol.

A particularly preferred class of polyhydric phenol carbonate esters is the class of carbonate esters of ortho-substituted trisphenols having three orth-substituted phenolic groups, such as 1,1,3-tris(2'methyl-4'-hydroxy-5'-t-butylphenyl)butane, 1,3,5-tris(3'-5'-di-t-butyl-4'-hydroxybenzyl)-2,4,6-trimethylbenzene, 2,2-bis(3'-t-butyl-4'-hydroxyphenyl)-4-(3'',5''-di-t-butyl-4''-hydroxyphenyl)butane, and 2,2-bis(2'methyl-5-butyl-4'-hydroxyphenyl)-4-(3'',5''-di-t-butyl-4''-hydroxyphenyl)butane.

The most preferred group of carbonate esters used in stabilizer compositions of this invention is defined by the formula

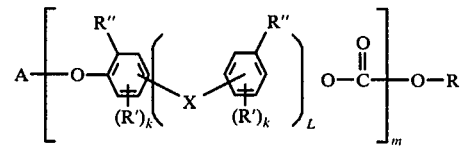

in which independently at each occurrence R' and R'' are selected from the group consisting of alkyl, cycloalkyl or arylalkyl radicals, A is selected from the group consisting of hydrogen and

R is selected from the group consisting of alkyl, aryl, and

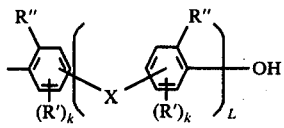

X has the structure

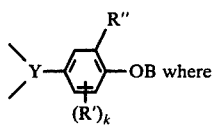

Y is a trivalent hydrocarbon radical, B is a hydrogen atom or the group

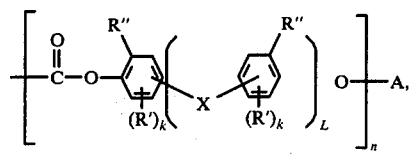

L is 0 or 1, $k$ is an integer from 0 to 3, $m$ is 1 to about 20, and $n$ is an average of 0.1 to about 20. Alkyl groups R'', R' and R have 1 to 10 carbon atoms; cycloalkyl R, R' and R'' groups have 5 to 10 carbon atoms and aralkyl groups R, R' and R'' have 7 to 10 carbon atoms; trivalent Y groups have 2 to 10 carbon atoms.

The polyhydric phenol carbonate esters of this invention can be prepared by the reaction of a carbonylating agent such as phosgene, a chloroformate ester, a dialkyl carbonate or a diaryl carbonate with a substituted dihydric or trihydric phenol in one or several reaction stages. Acid acceptors such as ammonia, pyridine, organic amines, and inorganic alkalies can be used with phosgene and chloroformate esters, and acidic or alkaline transesterification catalysts can facilitate the reaction of alkyl and aryl carbonate esters. The molecular weight of the ester is regulated by the proportions of carbonylating agent to dihydric or trihydric phenol. The more closely the molar proportions of the carbonylating agent to dihydric or trihydric phenol approach one to one the higher the molecular weight of the resulting product.

Conversely, either reactant can be used in large excess to prepare products having nearly the lowest molecular weight possible, that is an ester having a single carbonate ester group and two polyhydric phenol groups linked together. Thus the product of the reaction between two moles of a dihydric phenol and one mole of carbonylating agent is a relatively low molecular weight mixture of carbonate esters in which the bis(hydroxyaryl carbonate) of the dihydric phenol predominates, and the product of the reaction between two moles of a carbonate ester carbonylating agent (e.g. diphenyl carbonate) and one mole of dihydric phenol is a relatively low molecular weight mixture of carbonate esters in which the dihydric phenol bis(phenyl carbonate) ester predominates.

Each of these products can then be used to prepare a coester of this invention by reaction with an appropriate derivative of a different polyhydric phenol. Thus the above bis(hydroxyaryl) carbonate ester of one polyhydric phenol can be caused to condense with the bis-chloroformate or bis(phenylcarbonate) ester of the same or another polyhydric phenol, with elimination of hydrogen chloride or phenol as side product respectively, to give a polyhydric phenol carbonate ester or coester with a molecular weight depending on the relative proportions of reactants. Similarly, a polyhydric phenol phenyl carbonate ester can be transesterified with the same or different polyhydric phenol to displace phenol and give a carbonate coester of each polyhydric phenol present in each of the starting materials, which means that coesters can be made of different polyhydric phenols if each of the starting materials contains a different polyhydric phenol. Both techniques just described are essentially two stage reaction techniques that yield coesters of a relatively ordered structure in which different polyhydric phenol groups are alternatingly linked through carbonate ester groups. Coesters prepared at elevated temperature, such as by the phenyl ester transesterification technique, have the ordered alternating structure modified to a minor extent as a result of ester-ester interchange randomization. All these reactions can be illustrated by equations in which for convenience the symbols HO-Ar-OH and HO-Ar'-OH are used for the polyhydric phenols that can be used according to this invention, and Ph represents the phenyl group.

A. Condensation of hydroxyaryl carbonate with a polyhydric phenol chloroformate: 2 HO-Ar-OH+PhO-CO-OPh → HO-Ar-OCO-OAr-OH + 2 PhOH  2HO-Ar-OCO-OAr-OH + ClCO-OAr'-O-COCl → HOArOCO-OArO-CO-OAr'O-CO-OArO-CO-OArOH + 2 HCl B. Condensation of phenyl carbonate of polyhydric phenol with a different polyhydric phenol: HO-Ar-OH + 2 PhO-CO-OPh → PhO-CO-OAr-O-CO-OPh + 2PhOH  PhO-CO-OAr-O-CO-OPh + 2 HO-Ar'-OH → HO-Ar'-OCO-O-Ar-O-CO-O-Ar'OH + 2 PhOH C. Ester interchange randomization: HO-Ar'-OCO-OArO-CO-OAr'-OCO-O-ArO-CO-O-Ar'O-CO-OArO-CO-O-Ar'-OH + HO-Ar-OCOOAr'-O-CO-OArO-CO-OAr'O-CO-OArOH → HO-Ar'-OCO-OArO-CO-OArO-CO-OArO-CO-OAr'O-CO-OAr'OH + HO-Ar'-OCO-OAr'O-CO-OArO-CO-OAr-OCO-OAr'-OCO-OAr-OH Coesters of this invention can also be prepared in an single reaction step leading to a random arrangement of polyhydric phenol groups in the structure of the coester. Thus the mixture of more than one polyhydric phenol can be heated with diphenylcarbonate with removal of the sideproduct phenol. Alternatively, the mixture of polyhydric phenol can be reacted, suitably dissolved in an inert solvent such as toluene, methylene chloride or trichloroethylene, with carbonyl chloride (COCl$_2$) or a polyhydric phenol chlorocarbonate ester Ar(OCOCl)$_{2-3}$ with elimination of by-product hydrogen chloride by reaction with an acid acceptor which can be an organic amine dissolved in the reaction solution, a suspension of an inorganic alkali, or an aqueous solution of an inorganic alkali.

Both the phenyl ester reaction and the acid chloride reaction can be facilitated by the use of catalysts. The phenyl ester reaction is suitably catalyzed by substances of sufficient alkalinity to convert phenol at least in part to the phenoxide ion, such as alkali and alkaline earth metals and their oxides, hydroxides, sulfides, cyanides, phenolates, hydrides, alcoholates, and carboxylates as well as aliphatic and cycloaliphatic amines, preferably tertiary amines to avoid the possible complication of amide formation. Suitable catalysts for the acid chloride reaction include tertiary amines, tertiary phosphines, and the hydrogen halide and alkyl halide addition salts thereof. Catalyst concentrations usefully range from 0.01% to about 5% by weight of reaction mixture. Preferred catalysts for the acid chloride reaction have the ability to partition between water and an immiscible hydrocarbon phase with a partition coefficient between 0.01 and 100.

Both the phenyl ester reaction method of preparing the ester of this invention and the acid chloride method can be carried out over a convenient range of reaction temperatures. The phenyl ester reaction is conveniently carried out at elevated temperatures of the order of 80° to 210° C with removal of the side product phenol by distillation, suitably under diminished pressure. It is frequently helpful to begin the reaction by an atmospheric pressure cook, suitably with nitrogen or other inert gas protection over the reaction mass to preserve its light color, and apply vacuum gradually after a quantity of side product has accumulated for removal.

The acid chloride reaction is conveniently carried out at ambient temperatures or as cold as −15° C. Elevated temperatures in the 40° to 90° C range can also be used.

In esters prepared with an excess of equivalents of the dihydric or trihydric phenol reactant over the equivalents of carbonylating agent, the ester is predominantly terminated by hydroxyaryl groups, while in esters prepared with an excess of carbonylating agent over the phenol, ester termination predominates. The hydroxyaryl terminated esters having an average molecular weight ranging from 700 to about 10000 & especially with a molecular weight ranging from 1200 to about 7000 are preferred.

Carbonate esters that can be prepared according to this invention are shown in TABLE 1.

TABLE - 1

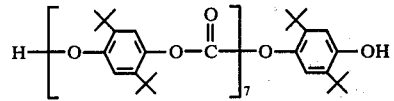
(1)

2,5-di-t-butylhydroquinone carbonate, approximate molecular weight 2100

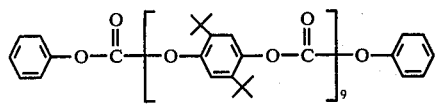
(2)

Diphenyl 2,5-di-t-butylhydroquinone carbonate, approx. mol. wt. 2400

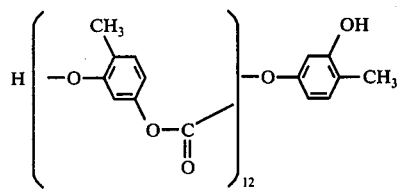
(3)

4-Methylresorcinol carbonate, approx. mol. wt. 1900

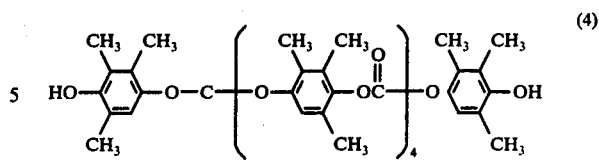
(4)

2,3,5-Trimethylhydroquinone carbonate, approx. mol. wt. 1,000

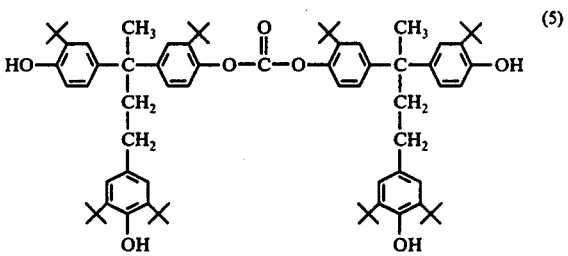
(5)

Bis(1(3′,5′-di-t-butyl-4′-hydroxyphenyl)-3,3-bis(3″-t-butyl-4″-hydroxyphenyl)-butane) carbonate, approx. mol. wt. 1100

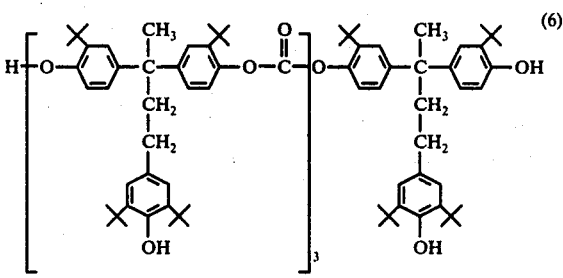
(6)

1(3′, 5′-di-t-butyl-4′-hydroxyphenyl)-3,3-bis(3″-t-butyl-4″hydroxyphenyl) butane carbonate, approx. mol. wt. 2200

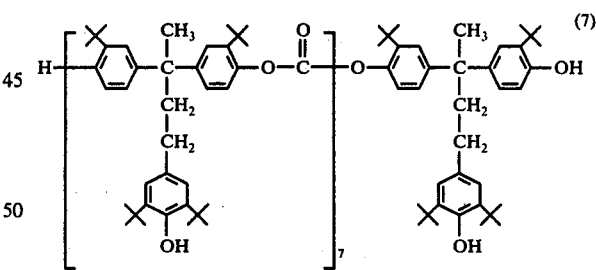
(7)

1(3′,5′-di-t-butyl-4′-hydroxyphenyl)-3,3-bis(3″-t-butyl-4″-hydroxyphenyl) butane carbonate, approx. mol. wt. 3700

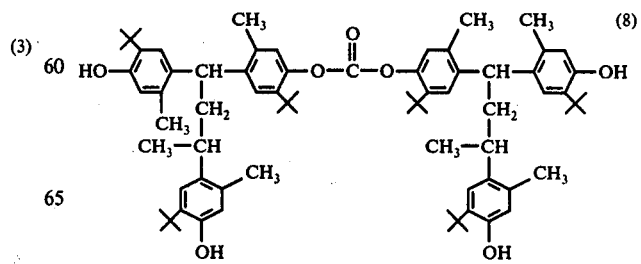
(8)

Bis(1,1,3-tris(2′methyl-4′-hydroxy-5′-t-butylphenyl)butane) carbonate approx. mol. wt. 1100

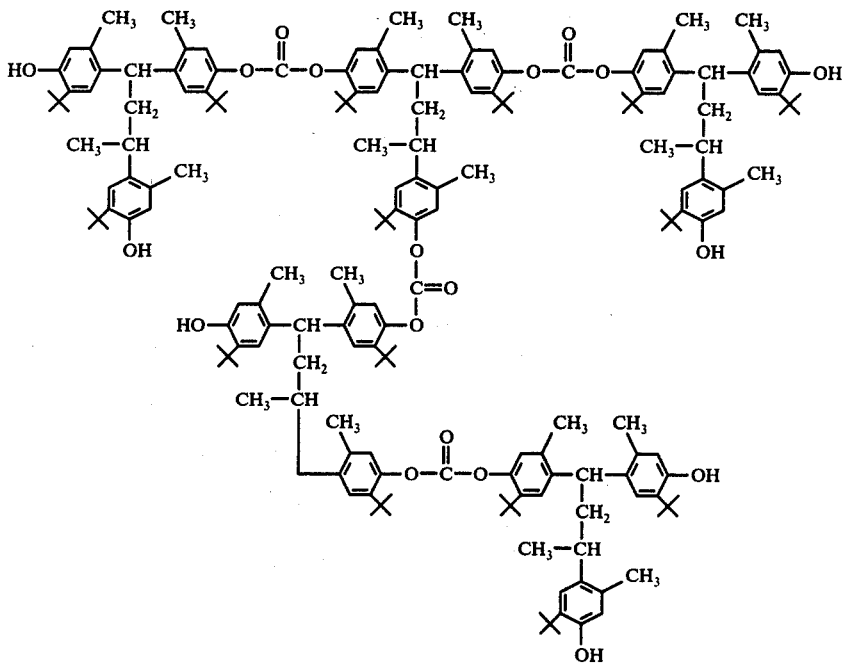

(9)

1,1,3-tris(2′-methyl-4′-hydroxy-5′-t-butylphenyl) butane carbonate, approx. mol. wt. 2700

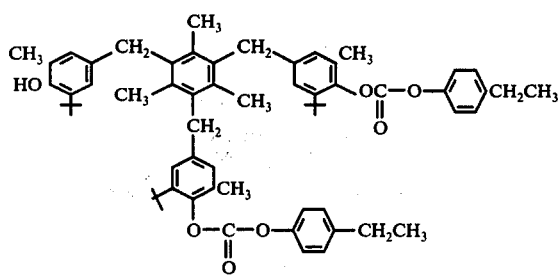

Bis(1,3,5-Tris(3′-t-butyl-4′-hydroxy-5′-methylphenyl)-2,4,6-trimethylbenzene) p-ethylphenyl carbonate, approx. mol. wt. 1000

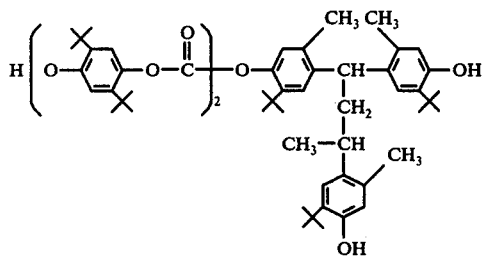

2,5-di-t-butylhydroquinone and 1,1,3-tris(2′methyl-4′hydroxy-5′-t-butylphenyl) butane carbonate coester, approx. mol. wt. 1100

Synthetic resins that can be stabilized with compositions comprising a polyhydric phenol ester according to this invention include alphaolefin polymers such as polyethylene, polypropylene, polybutene, poly-3-methylbutene, or copolymers thereof such as ethylene - vinylacetate copolymer, ethylenepropylene copolymer, polystyrene, polyvinylacetate, acrylic ester resins, co-polymers from styrene and another monomer (for example, maleic anhydride, butadiene, acrylonitrile and so on), acrylonitrile-butadiene-styrene copolymer, acrylic acid ester-butadiene-sytrene copolymer, methacrylic acid ester-butadiene-styrene copolymer, methacrylate ester resin such as polymethylmethacrylate, polyvinyl-alcohol, ethylene and butylene terephthalate polyesters, polyamide, polycarbonate, polyacetal, polyurethane, cellulosic resin, or phenolic resin, urea resin, melamine resin, epoxy resin, unsaturated polyester, silicone resin, halogen-containing resins such as polyvinyl chloride, polyvinylidene chloride, polyvinylidene fluoride and copolymers thereof, and further rubbers such as isoprene rubber, chloroprene rubber, and blends of the above resins.

Stabilizer compositions comprising a polyhydric phenol carbonate ester according to this invention can be formulated and marketed in liquid, solid, and paste forms. An inert solvent can be used to facilitate handling. The polyhydric phenol carbonate ester and known polymer stabilizers can also be solubilized in one another by heating, such as at 70°–160° C for up to 4 hours, and then allowing the resulting melt to cool and harden sufficiently to be flaked and ground.

Known polymer stabilizers can be used in synthetic resin compositions together with the ester stabilizers of this invention and can be admixed with the latter. Such stabilizers include thiodipropionic acid esters, polyvalent metal salts of carboxylic acids, organic phosphites, 1,2-epoxides, polyhydric alcohols, polyhydric alcohol 3-alkylthiopropionic acid esters, ultraviolet absorbers and heavy metal deactivators. Representative thiodipropionic acid esters include di-n-dodecyl thiodipropionic, dihexadecyl thiodipropionate, distearyl thiodipropionate, n-octyl eicosanyl thiodipropionate and n-octadecyl cyclohexane-1,4-dimethanol thiodipropionate polyester. A comprehensive disclosure of useful thiodipropionate esters by M. Minagawa et al in U.S. Pat. No. 3,869,423, column 17 line 55 to column 19 line 54 is here incorporated by reference. When thiodipropionate esters are used the concentration based on 100 parts of polymer can range from 0.05 to about 0.75 parts by weight.

Representative polyvalent metal salts include zinc, calcium, magnesium, barium, strontium and nickel salts of monocarboxylic acids having 6 to 24 carbon atoms, for example zinc benzoate, calcium palmitate, and nickel 2-ethylbutyrate. A comprehensive disclosure of useful metal salts by M. Minagawa et al in U.S. Pat. No. 3,869,423, column 19 line 56 column 20 line 35 is here incorporated by reference. When metal salts are used the concentration based on 100 parts by weight of polymer can range from 0.1 to about 3 parts by weight.

Representative organic phosphites include triisodecylphosphite, tris (nonylphenyl phosphite), and 4,4'-isopropylidene diphenol alkyl ($C_{12}$-$C_{15}$) phosphite. A comprehensive disclosure of useful organic phosphites by M. Minagawa in U.S. Pat. No. 3,849,370 column 13 line 63 to column 16 line 48 is here incorporated by reference. Typical use concentrations of organic phosphites are in the range from 0.02 part to about 2 parts by weight per 100 parts of polymer being stabilized.

Representative 1,2-epoxides that can be used in stabilizer compositions according to this invention include epoxysoybean oil, epoxylinseed oil, and 2-ethylhexyl epoxystearate. A comprehensive disclosure of 1,2-epoxides by M. Minagawa et al in U.S. Pat. No. 3,869,423 column 26 line 13 to line 39 is here incorporated by reference. Typical use concentrations of 1,2-epoxides range from 0.3 to about 6 parts by weight per 100 parts of synthetic resin composition.

Aliphatic polyhydroxy compounds can be included with stabilizer compositions of this invention in amounts corresponding to 0.1 to about 1 part per 100 parts of polymer being stabilized. Typical aliphatic polyhydroxy compounds are glycerol, polygylcerol, monodi-, and tri-pentaerythritol, mannitol, sorbitol, and partial esters of these with saturated and unsaturated fatty acids having 6 to 22 carbon atoms.

3-Alkylthiodipropionates of polyhydric alcohols can be included in stabilizer compositions of this invention in amounts corresponding to 0.02 to about 1 part per 100 parts of synthetic resin being stabilized. The propionate esters have 4 to about 34 carbon atoms in the alkylthiopropionate group, 2 to about 15 carbon atoms in the polyhydric alcohol group and 2 to about 8 ester groups in the molecule. Representative propionate esters are 2,2-dimethylpropanediol bis (3-n-dodecylthio-2-methylpropionate), pentaerythritol tetrakis (3-n-octylthiopropionate) and tris (3-n-octadecylthiopropionyloxyethyl-)isocyanurate. For a further listing of useful 3-alkylthiopropionates the disclosure of A. Onishi U.S. Pat. No. 3,629,194 can be consulted.

Ultraviolet absorbers can be included in stabilizer compositions of this invention in amounts corresponding to 0.05 to about 1 part per 100 parts of synthetic resin being protected. Typical ultraviolet absorbers are 2-hydroxybenzophenones such as 2-hydroxy-4-n-octyloxybenzophenone and 2,4-dihydroxybenzophenone, and 2-(2'hydroxyphenyl)benzotriazoles such as 2-(2'-hydroxy-5'-methylphenylbenzotriazole and 2-(2'-hydroxy-5'-t-butylphenyl) 5,6-dichlorobenzotriazole. For a further listing of many useful ultraviolet absorbers the disclosure of U.S. Pat. No. 3,395,112 of July 30, 1968, particularly column 14 line 40 to column 19 line 33, can be consulted. Stabilizer compositions according to this invention that protect synthetic resin compositions used in contact with materials containing heavy metals and their compounds, as in insulating materials for copper based electrical conductors or in compositions pigmented with heavy metal containing pigments such as rouge, talc, and iron-bearing asbestos, can contain heavy metal deactivators that counteract the prodegradant effect of the heavy metal on synthetic resin compositions that would be satisfactorily stabilized in the absence of heavy metal. Heavy metal deactivators that can be used in stabilizer compositions according to this invention include melamine, dicyandiamide, oxanilide, N,N'disalicyloylhydrazine 3-salicyloylamido-1,2,4-triazole, as well as the heavy metal deactivators disclosed by M. Minagawa in U.S. Pat. Nos. 3,549,572 (column 5 line 19 to column 10 line 23), 3,629,181 (column 5 line 15 to column 9 line 54), 3,673,152 (column 4 line 47 to column 8 line 62), and 3,849,370 (column 5 line 5 to column 13 line 45). These disclosures are here incorporated by reference. Illustrative of stabilizer compositions comprising carbonate esters of polyhydric phenols having an odd number of benzenoid rings according to this invention together with known polymer stabilizers are the following:

| Stabilizer Composition | Ingredients | Parts By Weight |
|---|---|---|
| I | 2,5-Diethylhydroquinone Polycarbonate approx. mol. wt. 1400 | 10 |
| | Zinc Stearate | 20 |
| | Magnesium benzoate | 15 |
| | Mannitol | 25 |
| II | (1-Phenylethyl) resorcinol polycarbonate approx. mol. wt. 1900 | 12 |
| | Barium nonylphenolate | 30 |
| | Zinc 2-ethylhexoate | 18 |
| | Diphenyl isodecyl phosphite | 40 |
| III | Polycarbonate of 2,3,5-trimethyl-hydroquinone, approx. mol. wt. 2900 | 25 |
| | 2-ethylhexyl epoxystearate | 45 |
| | tris(nonylphenyl) phosphite | 30 |
| IV | t-Octylresorcinol-2,5-di-t-butylhydroquinone copolycarbonate, Approx. mol. wt. 2900 | 10 |
| | Strontium laurate | 80 |
| | Zinc laurate | 40 |
| | Dipentaerythritol | 15 |
| V | 2,4-Dimethylresorcinol/1,1,3-tris-(2'-methyl-4'-hydroxy-5'-t-butylphenyl) butane copolycarbonate, approx. mol wt. 1700 | 25 |
| | Distearyl thiodipropionate | 45 |
| | Trihexadecyl phosphite | 10 |
| VI | Polycarbonate of t-butylhydroquinone, approx. mol wt. 4600 | 60 |
| | Dicyandiamide | 40 |
| VII | Methylhydroquinone-2,5-di-t-amylhydroquinone copolycarbonate approx. mol wt. 3300 | 15 |
| | Pentaerythritol bis (n-octadecyl phosphite) | 6 |
| VIII | Polycarbonate of 1,1,3-tris(2'-methyl-4'-hydroxy-5'-t-butane, approx. mol. wt. 2200 | 15 |
| | Trimethylolpropane tris (3-iso-tridecylthiopropionate) | 55 |
| | 2(2'-hydroxy-5'-methylphenyl) benzotriazole | 15 |
| IX | 2-Cyclohexyl-3-methylhydroquinone polycarbonate approx. mol. wt. 5600 | 32 |
| | di-isotridecylthiodipropionate | 20 |
| | Calcium myristate | 28 |
| | N,N'-disalicyloylhydrazine | 20 |

The preparation of the stabilized resin composition is easily accomplished by conventional procedures. A heated two roll mill, for example, is a convenient compounding tool for blending stabilizer compositions of the invention with polyolefins, vinyl chloride polymers, ABS polymers, ethylene-vinyl acetate copolymers and others.

The Examples that follow illustrate the invention without limiting its scope. Examples 1 through 5 describe the preparation of different polyhydric phenol carbonate esters of this invention by techniques disclosed above. Example 6 through 30 illustrate the use of carbonate ester stabilizers of this invention and stabilizer compositions comprising carbonate esters of this invention in the stabilization of olefin polymers, a vinyl chloride polymer, an ABS polymer, and a polyamide. The carbonate esters used in these Examples are referred to by their identifying number in Table 1 above.

EXAMPLE 1

Preparation of trimethylhydroquinone carbonate, compound No. 4 of Table 1.

21.4g (0.1 mole) of diphenyl carbonate, 18.2g (0.12 mole) of 2,3,5-trimethylhydroquinone and 0.1g of potassium carbonate were heated and stirred under the $N_2$-gas atmosphere at 150° C for 3 hours. After this, phenol was distilled off and the residue solidified to obtain a glassy solid. Distilled phenol was 105% of calculated quantity. M. P.: 97°–103° C, molecular weight: 975 (calculated value 1047).

EXAMPLE 2

Preparation of 2,2-bis(3't-butyl-4'-hydroxyphenyl)-4-(3'',5''-di-t-butyl-4''-hydroxyphenyl) butane carbonate, compound No. 6 of Table 1.

22.3g (0.04 mole) of 2,2-bis(3'-t-butyl-4'-hydroxyphenyl)-4-(3'',5''-di-t-butyl-4''-hydroxyphenyl) butane, 6.4g (0.03 mole) of diphenylcarbonate and 0.05g of potassium carbonate were heated and stirred under $N_2$-gas atmosphere at 150° C for 3 hours and then phenol was distilled off under reduced pressure (max. 160° C/3 mm Hg) to obtain a glassy solid. Distilled phenol was 98% of calculated quantity and molecular weight of the product was 2360 (calculated value: 2310).

EXAMPLE 3

Preparation of 1,1,3-tris(2'methyl-4'-hydroxy-5'-t-butylphenyl) butane carbonate, compund no. 9 of Table 1.

27.2g (0.05 mole) of 1,1,3-tris(2'-methyl-4'-hydroxy-5'-t-butylphenyl) butane, 8.6g (0.04 mole) of diphenylcarbonate and 0.05g of potassium carbonate were reacted under $N_2$ atmosphere at 150° C for 3 hours, and then phenol was distilled off under reduced pressure (max. 160° C/3 mm Hg) to obtain a glassy solid. Distilled phenol residue after cooling was 100% of the calculated quantity and the molecular weight of the product was 2740 (calculated value: 2824).

EXAMPLE 4

Preparation of 2,5-di-t-butylhydroquinone and 1,1,3-tris(2'-methyl-4'-hydroxy-5'-t-butylphenyl) butane carbonate coester Compound No. 11 of Table 1.

8.9g (0.04 mole) of 2,5'-di-t-butylhydroquinone, 10.9g (0.02 mole) of 1,1,3-tris(2'-methyl-4'-hydroxy-5'-t-butylphenyl) butane, 8.6g (0.04 mole) of diphenylcarbonate and 0.03g of potassium carbonate were heated and stirred at 140° C for 3 hours, then phenol was distilled off under reduced pressure to yield after cooling a glassy solid. Distilled phenol: 92%, molecular weight 870 (calculated value: 1069).

EXAMPLE 5

Preparation of 4,6-di-isopropylresorcinol carbonate, Compound No. 12 of Table 1

38.8g (0.2 mole) of 4,6-di-isopropylresorcinol, 42.3g (0.15 mole) of 4,6-isopropylresorcinol bis(chloroformate) and 500 ml pyridine were reacted under $N_2$ gas atmosphere at 75° C for 12 hours, then poured into 3000g ice and water, the precipitated pale tan powder collected and dried. Molecular weight: 1710 (calculated value: 1508)

EXAMPLE 6

Substantially unstabilized polypropylene (Profax 6501, containing a trace of BHT antioxidant to protect the polymer during shipment and storage only) 100 parts, distearyl thiodipropionate 0.3 part, and additive test candidate 0.15 part by weight were hand-mixed in a hemisperical bowl and fluxed on a two roll mill at 170° C for 5 minutes. Samples of each milled sheet were compression molded at 205° ± 3° C for 5 minutes to give smooth sheets 0.5mm in thickness. Strips 10 by 1.5cm were cut from each molded sheet and exposed lying flat on aluminum foil in an air circulating oven at 150° C until found to be embrittled and/or visibly degraded. The additive test candidate present in each sample and the observed time to embrittlement and/or visible degradation in the oven at 150° C are shown in Table-2.

Table 2

| Sample | Additive Test Candidate | 150° C Days to Failure |
| --- | --- | --- |
| Control A | Pentaerythritol tetrakis (3,5-di-t-butyl 4-hydroxy-hydrocinnamate) | 102 |
| Control B | "PC-10" commercial polyphenol carbonate | 94 |
| Example 6 | 1,1,3-Tris(2'methyl-4'-hydroxy-5'-t-butylphenyl) butane carbonate, approx. mol. wt. 2700 (Table 1, compound 9) | 127 |

The results show that the carbonate ester of this invention used in Example 6 is clearly a more effective stabilizer for polypropylene than the additives used in Control A or in Control B. To appreciate the significance of this finding it should be noted that the additive of Control A is widely accepted in industry as the most powerful antioxidant available, and the additive of Control B is described as the most effective of the polycarbonate type stabiliers by D. Plank in the publication "Polycarbonates: A New Concept in Stabilization of Polypropylene".

EXAMPLES 7 and 8:

Substantially unstabilized polypropylene resin (Profax 6501, containing a trace of BHT antioxidant to protect the polymer during shipment and a storage only) 100 parts by weight, dilaurylthiodipropionate 0.2 part by weight, and polyhydric phenol carbonate ester 0.2 part by weight were mixed for ten minutes by mixing and grinding at room temperature and milled and molded to make a sheet of 1.0mm in thickness at 180° C and 200 kg/cm² for 5 minutes. This sheet was cut into ten sample pieces of 10 × 20 mm of each formulation, and exposed on aluminum foil in a Geer air-circulating oven at 160° C for heat stability examination. The time to the beginning of degradation was taken as the time when more five sample pieces in ten of each formulation were discolored and brittle. The stabilizer ingredients used and the results obtained are shown in Table 3.

TABLE 3

| No. Control | Stabilizer | Deterioration Beginning Time | |
|---|---|---|---|
| C | 1,1,3-Tris(2'-methyl-5'-t-butyl-4'-hydroxyphenyl-butane | 650 | hours |
| D | None | 110 | |
| E | 4,4'-Isopropylidenebisphenol carbonate, approx. mol. wt. 950 | 340 | |
| Example | Polyhydric phenol carbonate | | |
| 7 | No. 2 | 1030 | |
| 8 | No. 9 | 1300 | |

Each of the polypropylene samples of Examples 7 and 8 stabilized according to this invention with an ester of carbonic acid and a hydrocarbon substituted polyhydric phenol with 1 or 3 benzene rings had at least 50% greater heat stability than any of the control compositions.

EXAMPLES 9 and 10

Stabilized polyethylene resin (Hi-Zex 5100E, Mitsui Petrochemical Industries, Ltd. Japan) 100 parts by weight and a polyhydric phenol carbonate ester 0.15 part by weight were milled on a two roll mill for 5 minutes at 150° C and then molded into a sheet of 1.2mm thickness by compression molding at 150° C and 180 kg/cm$^2$ for 5 minutes. The sheet was cut into sample pieces of 10 × 20 mm and tested for heat stability in the Geer oven at 148.5° C in air on aluminum foil. The time to the beginning of degradation was taken as the time when more than five sample pieces in ten of each formulation were discolored and brittle. The stabilizer ingredients used and the results obtained are shown in Table 4.

TABLE 4

| Control | Stabilizer | Deterioration Beginning Time | |
|---|---|---|---|
| F | NONE | 170 | hours |
| G | BHT Antioxidant | 212 | hours |
| Example | Polyhydric phenol carbonate | | |
| 9 | No. 5 | 364 | |
| 10 | NO. 6 | 420 | |

Each of the polyethylene samples of Examples 9 and 10 stabilized according to this invention with a carbonate of a hydrocarbon substituted polyhydric phenol having 3 benzenoid rings had at least 32% greater heat stability than a control sample stabilized instead with a known phenolic antioxidant.

EXAMPLES 11 to 13

ABS resin (Blendex 111) 100 parts by weight, zinc stearate 0.5 part by weight, titanium oxide 5.0 parts by weight, and a polyhydric phenol carbonate ester 0.5 part by weight were mixed by grinding at room temperature for 10 minutes.

The compound was prepared by extruding the ground mixture using a 30mm extruder at 30 rpm and 240° C. A sheet of 0.5mm thickness was prepared by compression molding each extruded compound at 200kg/cm$^2$ and 180° C for 5 minutes. Each molded sheet was cut to the size of 40 × 150mm, and suspended in an individual glass cylinder.

Each cylinder was set in an air circulating oven at 140° C, flushed with pure oxygen, the pressure adjusted to one atmosphere, and the cylinder fitted with a closed end manometer. The time to beginning of oxidation-degradation was read by recording the time when the pressure in the cylinder diminished rapidly. The ingredients of the stabilizer combination used in each example and the results observed are shown in Table 5.

TABLE 5

| No. Control | Stabilizer | Deterioration Beginning Time | |
|---|---|---|---|
| H | NONE | 170 | minutes |
| I | 4,4'-thiobis(3-methyl-6-t-butylphenol) | 240 | |
| Example | Polyhydric phenol carbonate | | |
| 11 | No. 1 | 430 | |
| 12 | No. 8 | 590 | |
| 13 | No. 9 | 620 | |

Each of the ABS polymer samples of Examples 11 through 13 stabilized according to this invention with an ester of carbonic acid and a hydrocarbon substituted polyhydric phenol with one or three benzenoid rings had at least 79% greater heat stability than a control sample stabilized with the same zinc stearate as in Examples 11 through 13 along with a conventional polyhydric phenol stabilizer.

EXAMPLES 14 to 16

A clear sheet was prepared by kneading polyvinyl-chloride resin (Geon 103EP) 100 parts, dioctylphthalate 42 parts, epoxidized soybean oil 3 parts, zinc stearate 0.3 part, barium stearate 0.5 part, stearic acid 0.3 part, and a polyhydric phenol carbonate ester 0.3 part on a two roll mill at 175° C for 5 minutes and then compression molding at 175° C. Then, a heat stability test was carried out in a Geer oven at 190° C in an air atmosphere. The time to degradation was determined by the discoloration observed. The polyhydric phenol carbonate ester used and the results obtained are shown in Table 6.

TABLE 6

| No. Control | Stabilizer | Beginning Time Of Deterioration | |
|---|---|---|---|
| | | Yellowed | Blackened |
| J | None | 30 min. | 45 min. |
| K | 4,4'-n-butylidenebis (3-methyl-6-t-butylphenol) | 30 | 55 |
| Example | Polyhydric phenol ester | | |
| 14 | No. 2 | 50 | 70 |
| 15 | No. 6 | 70 | 80 |
| 16 | No. 7 | 65 | 80 |

Each of the polyvinyl chloride samples of Examples 14 through 16 stabilized according to this invention with an ester of carbonic acid and a hydrocarbon substituted polyhydricphenol having 1 or 3 benzenoid rings along with epoxidized soybean oil, zinc stearate, and barium stearate, had at least 55% greater heat stability than a control sample containing a conventional antioxidant along with the same epoxidized soybean oil, zinc stearate, and barium stearate.

EXAMPLES 17 and 18

100 parts of nylon 66 delustered by adding 0.05% of titanium dioxide was dissolved in 90 parts of 90% formic acid, and 1.0 part of a polyhydric phenol carbonate ester was added and mixed completely. The solution was flowed uniformly on a glass plate, and dried in a heated air oven at 105° C for 10 minutes to prepare a film. The color of the film, after being heated in an air oven at 225° C for 30 minutes, was measured and shown in Table 7 along with the compounds present in each formulation.

TABLE 7

| No. | Stabilizer | Color of Sheet |
|---|---|---|
| Control | | |
| L | None | Dark brown |
| M | BHT antioxidant | Brown |
| Example | Polyhydricphenol carbonate | |
| 17 | No. 6 | Light yellow |
| 18 | No. 8 | Light yellow |

Each of the nylon samples of Examples 17 and 18 stabilized according to this invention with an ester of carbonic acid and a hydrocarbon substituted polyhydricphenol with 3 benzenoid rings gave a much lighter colored film than control samples containing instead of the coester according to this invention a conventional phenol stabilizer or no stabilizer.

EXAMPLES 19 through 21

In order to examine the effect of the stabilizer according to this invention on polybutene resin, a sheet of 1 mm in thickness was prepared by kneading the following formulation on a two roll mill and then compression molding at 160° C and 200 kg/cm² for 5 minutes. The sheet obtained was cut to the size of 40 × 150 mm, and tested for heat stability in glass cylinders containing pure oxygen at 1 atmosphere pressure as in Examples 11 to 13 except that the test temperature was 160° C.

| (Formulation) | | |
|---|---|---|
| Un-stabilized poly-1-butene resin | 100 | parts by weight |
| Calcium stearate | .0 | |
| Distearylthiodipropionate | 0.2 | |
| Polyhydric phenol carbonate ester | 0.2 | |

The results are shown in Table 8. The time to beginning of oxidation degradation was read by recording the time when the pressure in the cylinder diminished rapidly.

TABLE 8

| No. | Stabilizer | Deterioration Beginning Time | |
|---|---|---|---|
| Control | | | |
| N | BHT | 95 | hours |
| O | 1600 mol. wt. carbonate ester of 4,4'-isopropylidenediphenol | 120 | hours |
| Example | Polyhydric phenol carbonate ester | | |
| 19 | No. 5 | 530 | |
| 20 | No. 6 | 560 | |
| 21 | No. 9 | 500 | |

Each of the polybutene samples of Examples 19 through 21 stabilized according to this invention with an ester of carbonic acid and a hydrocarbon substituted polyhydricphenol having three benzenoid rings had at least four times the heat stability of a control sample stabilizer with the same distearylthiodipropionate and calcium stearate as in Example 19 through 21 along with a conventional polyhydric phenolic antioxidant or a polyhydricphenol carbonate ester not of this invention.

EXAMPLES 22 through 23

In order to examine the effects of the esters according to this invention in ethylene-vinylacetate copolymer, samples were prepared according to the following formulation and tested for heat stability in a Geer oven at 175° C and initial color was measured for yellowness using the Hunter color difference meter, greater numbers indicating more severe discoloration. The results are shown in Table 9. The heat stability is expressed in minutes of heating in the oven until a red or brown discoloration was observed.

| (Formulation) | | |
|---|---|---|
| Ethylene-Vinylacetate copolymer resin | 100 | parts |
| Montan wax ester lubricant | 0.3 | |
| Polyhydric phenol carbonate ester | 0.1 | |

TABLE 9

| No. | Sample Compound | Heat Stability | | Initial Color |
|---|---|---|---|---|
| Control | Stabilizer | | | |
| P | None | 75 | min. | 32 |
| Q | 4,4'-isopropylidenebisphenol carbonate, approx mol wt 950 | 75 | | 25 |
| R | BHT Antioxidant | 90 | | 28 |
| Example | Polyhydric phenol coester | | | |
| 22 | No. 6 | 135 | | 8 |
| 23 | No. 9 | 150 | | 9 |

Each of the ethylene-vinylacetate copolymer samples of Examples 22 and 23 stabilized according to this invention with an ester of carbonic acid and a hydrocarbon substituted polyhydric phenol having 3 benzenoid rings had much lighter initial color and at least 50% greater heat stability than a control sample stabilized with a conventional polyhydric phenol or a polyhydric phenol carbonate ester not of this invention.

EXAMPLES 24 to 26

The stabilizer combinations according to this invention have an excellent stabilizing effect on crosslinked polyethylene. Unstabilized low density polyethylene (meltindex 2.0) 100 parts by weight, dilaurylthiodipropionate 0.2 part by weight, and a polyhydric phenol carbonate ester 0.2 part by weight were mixed by milling on a two roll mill at 100° C for 10 minutes and then dicumyl peroxide (Percumyl D, Nippon Oil and Fats Co., Ltd.) 2.0 parts by weight was added and further kneaded at the same temperature for two minutes. This sheet prepared on the mill was compression molded at 110° C and 100 kg/cm² for 5 minutes, then rapidly heated up to 180° C while maintaining the pressure at 100 kg/cm² for 15 minutes. The sheet obtained was cut to the size of 40 × 150 mm, hung in a Geer oven and tested for heat stability in air at 160° C. The degradation time was judged by looking for the time when more than 50% of pieces were discolored or deformed. The stabilizers ingredients used and the results obtained are shown in Table 10.

TABLE 10

| No. | Sample Compound | Beginning Time of Aging | |
|---|---|---|---|
| Control | Stabilizer | | |
| S | None | 30 | hours |
| T | 4,4'-butylidenebis(3-methyl-6-t-butylphenol) | 36 | |
| Example | Polyhydricphenol carbonate | | |
| 24 | No. 5 | 164 | |
| 25 | No. 6 | 170 | |
| 26 | No. 8 | 178 | |

Each of the cross-linked polyethylene samples of Example 24 through 26 stabilized according to this invention with an ester of carbonic acid and a hydrocarbon substituted polyhydric phenol having 3 benzenoid rings had at least four times the heat stability than a control sample stabilized with a conventional polyhydric phenol.

EXAMPLES 27 to 30

In order to examine the stabilizing effect of stabilizer compositions according to this invention, un-stabilized polypropylene resin 100 parts by weight and a carbonate ester according to this invention or other stabilizer used for purpose of comparison 0.3 part by weight were ground together for 10 minutes at room temperature. This mixed powder blend was kneaded on a two roll mill at 180° C for six minutes and from the mill stock a sheet of 1.0 mm in thickness was prepared by compression molding at 180° C and 200 kg/cm² for 5 minutes. Each molded sheet was cut to the size of 40 × 150 mm, and suspended in an individual glass cylinder. Each cylinder was set in an air circulating oven at 160.5° C, flushed with pure oxygen, the pressure adjusted to one atmosphere, and the cylinder fitted with a closed manometer. The time to beginning of oxidation-degradation was read by recording the time when the pressure in the cylinder diminished rapidly. The ingredients of the stabilizer combination used in each example and the results observed are shown in Table 11.

TABLE 11

| No. | Stabilizer | Degradation Beginning Time |
|---|---|---|
| Control | | |
| U | None | 5 hours |
| V | 4,4'-butylidenebis(3-methyl--6-t-butyl)phenol | 23 |
| W | Carbonate ester of 4,4'-isopropylidenediphenol, approx. mol. wt. 950. | 7 |
| Example | | |
| 27 | Carbonate ester No. 1 (Table 1) | 84 |
| 28 | Carbonate ester No. 5 | 103 |
| 29 | Carbonate ester No. 7 | 120 |
| 30 | Carbonate ester No. 8 | 97 |

The results of these experiments demonstrate the stabilizing effectiveness of the carbonate esters of polyhydric phenols having one and three benzenoid rings according to this invention. The observed times to the beginning of degradation as shown by a drop in oxygen pressure are far greater for the carbonate esters of Examples 27 to 30 than for a carbonate ester not of this invention (Control W), a conventional polyhydric phenol (Control V) or no stabilizer (Control U).

We claim:

1. As a new composition of matter, a carbonate ester having a molecular weight between 700 and about 7000, of at least one hydrocarbon-substituted phenol, each hydrocarbon-substituted phenol having 2 to 3 phenolic hydroxyl groups disposed on an odd number of benzenoid rings, and having a formula

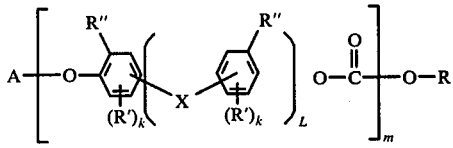

in which independently at each occurrence R' and R" are selected from the group consisting of alkyl having one to 10 carbon atoms, cycloalkyl having 5 to 10 carbon atoms, and alkylcycloalkyl having 6 to 10 carbon atoms, A is selected from the group consisting of hydrogen and

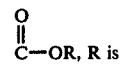

selected from the group consisting of alkyl, aryl, and

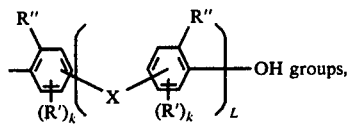

X has the structure

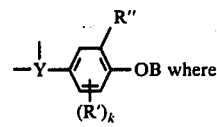

Y is a hydrocarbon radical, B is selected from the group consisting of hydrogen and

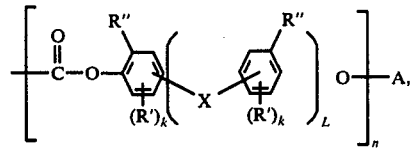

L is 0 or 1, K is an integer from 0 to 3, $m$ is 1 to about 20, and $n$ is an average of 0.1 to about 20.

2. A carbonate ester according to claim 1 having a molecular weight between 1200 and about 7000.

3. A carbonate ester according to claim 1 in which the polyhydric phenol has 3 benzenoid rings in the molecule.

4. A carbonate ester according to claim 1 in which the polyhydric phenol has a single benzenoid ring in the molecule.

5. A carbonate ester according to claim 4 in which the phenol is 2,5-di-t-butylhydroquinone.

6. A carbonate ester according to claim 3 in which the phenol is 1,1,3-tris(2'methyl-4'-hydroxy-5'-t-butylphenyl) butane.

7. A carbonate ester according to claim 3 in which the phenol is 1(3',5'-di-t-butyl-4'-hydroxyphenyl)-3,3-bis(3'-t-butyl-4'-hydroxyphenyl) butane.

8. A carbonate ester according to claim 1 of a phenol having two hydroxyl groups and a single benzenoid ring and a phenol having three hydroxyl groups and three benzenoid rings.

9. A stabilizer composition capable of increasing the resistance to deterioration on heating of a synthetic resin, comprising a carbonate ester according to claim 1 and at least one synthetic resin stabilizer selected from the group consisting of thiodipropionate esters, 1,2-epoxides, organic phosphites, polyhydric alcohols, polyhydric alcohol 3-alkylthiopropionates, ultraviolet absorbers, heavy metal deactivators, and barium, calcium, magnesium, nickel, strontium, tin, and zinc salts of monocarboxylic acids having 6 to 24 carbon atoms.

10. A stabilizer composition according to claim 9 in which the synthetic resin stabilizer is a thiodipropionate ester.

11. A stabilizer composition according to claim 9 in which the synthetic resin stabilizer is a 1,2-epoxide.

12. A stabilized synthetic resin composition comprising a synthetic resin and a carbonate ester according to claim 1.

13. A stabilized synthetic resin composition according to claim 12 in which the synthetic resin is selected from the group consisting of olefin polymers, vinyl chloride polymers, acrylonitrile copolymers and polyamides.

14. A stabilized synthetic resin composition according to claim 12 comprising polyvinyl chloride, epoxidized soybean oil, and zinc stearate.

15. A stabilized synthetic resin composition according to claim 12 comprising an acrylonitrile-butadiene-styrene polymer and zinc stearate.

16. A stabilized synthetic resin composition according to claim 12 comprising polybutene, calcium stearate, and dilaurylthiodipropionate.

17. A stabilized synthetic resin composition according to claim 12 in which the amount of carbonate ester is 0.01 to 5% by weight of the resin.

* * * * *